US012689607B2

(12) United States Patent
Stephan et al.

(10) Patent No.: US 12,689,607 B2
(45) Date of Patent: Jul. 21, 2026

(54) DELEGATION OF A NAMING IDENTIFIER RESOLUTION FUNCTION

(71) Applicant: Orange, Issy-les-Moulineaux (FR)

(72) Inventors: Emile Stephan, Chatillon (FR); Gaël Fromentoux, Chatillon (FR); Frédéric Fieau, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/907,079

(22) PCT Filed: Mar. 22, 2021

(86) PCT No.: PCT/FR2021/050467
§ 371 (c)(1),
(2) Date: Sep. 22, 2022

(87) PCT Pub. No.: WO2021/191536
PCT Pub. Date: Sep. 30, 2021

(65) Prior Publication Data
US 2023/0344795 A1    Oct. 26, 2023

(30) Foreign Application Priority Data

Mar. 24, 2020    (FR) ...................................... 2002880

(51) Int. Cl.
H04L 61/4511        (2022.01)
G06F 15/16            (2006.01)
(Continued)

(52) U.S. Cl.
CPC ........ H04L 61/4511 (2022.05); H04L 63/123 (2013.01)

(58) Field of Classification Search
CPC ............................ H04L 61/4511; H04L 63/123
(Continued)

(56) References Cited

U.S. PATENT DOCUMENTS 8,335,211 B2 * 12/2012 Miyata ................ H04L 65/1104
370/360
2002/0017558 A1 * 2/2002 Graves ................ G06K 7/0004
235/380
(Continued)

FOREIGN PATENT DOCUMENTS

FR        3105678 A1 *  6/2021   .......... H04L 61/1511
WO    WO-2005045600 A2 *  5/2005   ............. G06F 15/16
(Continued)

OTHER PUBLICATIONS

International Search Report for PCT/FR2021/050467 dated Jun. 23, 2021 by European Patent Office.

*Primary Examiner* — Berhanu Shitayewoldetadik
(74) *Attorney, Agent, or Firm* — Knobbe, Martens, Olson & Bear, LLP

(57)                ABSTRACT

In some existing naming identifier resolution solutions, a resolver obtains network addresses of servers associated with a naming identifier to be resolved and located in a third-party network that is not managed by an Internet service provider for which a user of a terminal has subscribed to a service offering. This impacts the resource management of communication devices managed by the Internet service provider and involved in the resolution of naming identifiers that are not used in an optimum manner. The method allows a third-party company to delegate the naming identifier resolution performed by resolvers of the third-party company to web servers managed by an Internet service provider. Delegating the naming identifier resolution to these web servers makes it possible to reduce costs linked to naming identifier resolution and also exhibits improved performance.

13 Claims, 3 Drawing Sheets

(51) Int. Cl.

| | |
|---|---|
| *G06F 15/177* | (2006.01) |
| *H04L 9/40* | (2022.01) |
| *H04L 12/26* | (2006.01) |
| *H04L 15/16* | (2006.01) |
| *H04L 29/06* | (2006.01) |
| *H04L 29/08* | (2006.01) |
| *H04L 29/12* | (2006.01) |

(58) Field of Classification Search
USPC ........................................................ 709/245
See application file for complete search history.

(56) References Cited

U.S. PATENT DOCUMENTS

| | | | | | |
|---|---|---|---|---|---|
| 2002/0124058 | A1* | 9/2002 | Ehrensvard | ............. | H04L 61/00 |
| | | | | | 707/E17.112 |
| 2006/0112176 | A1* | 5/2006 | Liu | ........................ | H04L 67/101 |
| | | | | | 709/245 |
| 2006/0212599 | A1* | 9/2006 | Lucco | ................... | H04L 67/563 |
| | | | | | 709/245 |
| 2009/0259853 | A1* | 10/2009 | Swildens | .............. | H04L 63/102 |
| | | | | | 713/176 |
| 2012/0185370 | A1* | 7/2012 | Davie | .................... | G06Q 30/04 |
| | | | | | 713/176 |
| 2012/0284505 | A1* | 11/2012 | Smith | .................... | H04L 63/08 |
| | | | | | 713/151 |
| 2013/0262696 | A1* | 10/2013 | Watanabe | ............... | H04L 67/56 |
| | | | | | 709/238 |

| | | | | | |
|---|---|---|---|---|---|
| 2014/0143543 | A1* | 5/2014 | Aikas | .................. | H04L 67/1097 |
| | | | | | 713/168 |
| 2014/0298037 | A1* | 10/2014 | Xiao | ................... | H04L 63/0869 |
| | | | | | 713/181 |
| 2015/0052056 | A1* | 2/2015 | Serebrennikov | ... | G06Q 20/4014 |
| | | | | | 705/44 |
| 2015/0089061 | A1* | 3/2015 | Li | ........................... | H04L 69/14 |
| | | | | | 709/226 |
| 2016/0050292 | A1* | 2/2016 | Chen | ................... | G06F 16/9566 |
| | | | | | 709/219 |
| 2016/0087933 | A1* | 3/2016 | Johnson | ................. | H04L 41/08 |
| | | | | | 709/245 |
| 2017/0048186 | A1* | 2/2017 | Blinn | ................. | H04L 61/4552 |
| 2017/0126616 | A1 | 5/2017 | Halley et al. | | |
| 2017/0272250 | A1* | 9/2017 | Kaliski, Jr. | .......... | H04L 9/3239 |
| 2018/0077134 | A1* | 3/2018 | Beecham | ............. | H04L 9/3247 |
| 2018/0097831 | A1* | 4/2018 | Uppal | ................. | H04L 63/0428 |
| 2018/0278572 | A1* | 9/2018 | Halley | ..................... | H04L 9/40 |
| 2019/0199822 | A1* | 6/2019 | Desbureaux | ........... | H04L 63/10 |
| 2020/0059525 | A1* | 2/2020 | Zhu | ....................... | H04L 67/563 |
| 2020/0137022 | A1* | 4/2020 | Dupont | .................. | H04L 61/10 |
| 2020/0227160 | A1* | 7/2020 | Youngblood | .......... | G16H 50/20 |
| 2021/0352049 | A1* | 11/2021 | Aabye | ................ | H04L 63/0414 |

FOREIGN PATENT DOCUMENTS

| | | | | | |
|---|---|---|---|---|---|
| WO | WO-2007138228 A2 | * | 12/2007 | ....... | H04L 29/12066 |
| WO | WO-2013087039 A1 | * | 6/2013 | ......... | H04L 63/0428 |
| WO | WO 2018/130796 A1 | | 7/2018 | | |
| WO | WO-2020128238 A1 | * | 6/2020 | .......... | H04L 61/1511 |

* cited by examiner

10

14

DELEGATION OF A NAMING IDENTIFIER RESOLUTION FUNCTION

CROSS-REFERENCE TO RELATED APPLICATIONS

This application is filed under 35 U.S.C. § 371 as the U.S. National Phase of Application No. PCT/FR2021/050467 entitled "DELEGATION OF A NAMING IDENTIFIER RESOLUTION FUNCTION" and filed Mar. 22, 2021, and which claims priority to FR 2002880 filed Mar. 24, 2020, each of which is incorporated by reference in its entirety.

BACKGROUND

Field

The field of the development is that of the resolution of naming identifiers, such as domain names. More specifically, the development relates to the delegation of a naming identifier resolution function, normally executed by naming identifier resolvers, to servers not embedding this function, such as servers hosting resources that terminals can access via a web browser.

Description of the Related Technology

FIG. 1 shows an example of a naming identifier resolution scenario. A terminal 10 transmits a request to resolve encrypted EFQDN (external fully qualified domain name) naming identifiers to a public naming identifier resolver 11 managed by a third-party company. The public resolver 11 then obtains, from an authoritative server 12 associated with a naming identifier, network addresses, such as, for example, IPv4 or Ipv6-type IP (internet protocol) addresses associated with servers 13 associated with the naming identifier to be resolved, these servers 13 storing data relating to the implementation of a service requested by the terminal 10 such as data relating to a Web page or data relating to downloadable content, etc. Such servers 13 are located in a distinct third-party network that is not managed by an ISP (internet service provider) with which a user of the terminal 10 has subscribed to a service offer.

Once in possession of the IP (internet protocol) addresses associated with the servers 13, the public resolver 11 transmits at least one of the IP addresses associated with the servers 13 to the terminal 10. The terminal 10 then establishes a connection with the corresponding server 13 and can access data relating to the implementation of the service requested.

In this scenario, the servers 13 associated with a naming identifier to be resolved are selected by the third-party company that manages the authoritative servers 12 without cooperation with the internet service provider ISP with which a user of the terminal 10 has subscribed to a service offer.

This impacts the management of the resources of different communication devices, managed by the internet service provider ISP with which a user of the terminal 10 has subscribed to a service offer and which are involved in the resolution of naming identifiers that may not be used in an optimal manner.

There is therefore a need for a technique for the resolution of naming identifiers that is free of some or all of the disadvantages mentioned above.

SUMMARY

The development responds to this need by proposing a method for resolving at least one naming identifier, said method being implemented by a server hosting resources that at least one terminal can access, and comprising the following steps:

receiving a resource request transmitted by the terminal, in response to the resource request, transmitting, to the terminal, a message including at least one parameter, referred to as a delegation parameter, relating to an authorization for execution, by said server hosting resources, of a function of resolving at least one naming identifier, transmitting, to the terminal, at least one network address of a server associated with the naming identifier to be resolved.

Such a solution makes it possible for a third-party company that so wishes to delegate the naming identifier resolution carried out, by default, by naming identifier resolvers, which the third-party company manages, to servers hosting resources, such as web servers, managed for example by an internet service provider.

The delegation of the naming identifier resolution to servers hosting resources makes it possible to reduce costs associated with the execution of this naming identifier resolution function. Indeed, by delegating the naming identifier resolution to a server hosting resources, it is possible to reduce the number of connections between communication devices in order to resolve a naming identifier, in particular by reusing the existing connections between the user devices and the servers hosting resources. Such a reduction in the number of connections between communication devices leads to a reduction in the energy consumption of these communication devices.

In addition, such a solution of delegating the naming identifier resolution also has increased performance. This is because the number of connections established between communication devices in order to resolve a naming identifier is reduced.

Finally, the proposed solution of delegating the naming identifier resolution is reliable. Indeed, in the context of the naming resolution method described, a server hosting resources implementing a naming identifier resolution instead of a naming identifier resolver is provided with an authorization to execute this function of resolving at least one naming identifier, which can be verified if necessary.

According to a particular feature of the naming identifier resolution method, the delegation parameter is a digital fingerprint of the naming identifier associated with the server hosting resources signed by a cryptographic key associated with an authoritative server associated with at least one naming identifier.

The delegation parameter is generated by an authoritative server associated with a naming identifier and is specific to each server hosting resources to which a naming identifier resolution function is delegated. Thus, only one server hosting resources authorized by an authoritative server associated with a naming identifier is delegated the naming identifier resolution.

According to a particular feature of the naming identifier resolution method, this includes, prior to the step of transmitting the delegation parameter, a step of receiving a message including the delegation parameter.

In a particular implementation of the naming identifier resolution method, the message received is transmitted by said authoritative server associated with at least one naming identifier.

Thus, the authoritative server associated with a naming identifier to be resolved directly transmits the delegation parameter to the server hosting resources concerned.

In a particular implementation of the naming identifier resolution method, the message received is transmitted by a naming identifier resolver.

In this implementation, the naming identifier resolver intended to resolve a particular naming identifier relays a message, transmitted by the authoritative server associated with the particular naming identifier and including the delegation parameter, to the server hosting resources concerned. In this implementation, the naming identifier resolver intended to resolve a particular naming identifier is thus informed of the delegation of the resolution of the particular naming identifier.

The development also relates to a method for requesting the resolution of at least one naming identifier, said method being implemented by a terminal and comprising the following steps:

transmitting a resource request to a server hosting resources that the terminal can access, receiving a message, transmitted by the server hosting resources, including at least one parameter, referred to as a delegation parameter, relating to an authorization for execution, by said server hosting resources, of a function of resolving at least one naming identifier, verifying the authenticity of said delegation parameter, when the authenticity of said delegation parameter is verified, transmitting a resource request to a server associated with the naming identifier to be resolved and for which a network address is provided by the server hosting resources.

The terminal receives, in response to a request for access to the resources hosted by the server hosting resources, the delegation parameter of the server hosting resources.

The terminal then verifies the authenticity of this delegation parameter prior to any resolution of naming identifiers so as to ensure the reliability of the server hosting resources with regard to the resolution of naming identifiers.

Method for requesting the resolution of at least one naming identifier according to claim 6, including, when the authenticity of said delegation parameter is not verified, a step of transmitting a naming identifier resolution request to a naming identifier resolver.

When the terminal determines that the server hosting data is not authorized to resolve a particular naming identifier, the terminal then transmits a request to resolve the naming identifier in question to a naming identifier resolver that is known to be authorized to resolve the naming identifiers.

According to an implementation of the method for requesting the resolution of at least one naming identifier, the method includes a step of receiving a message, transmitted by the server hosting resources, including at least one network address of a server associated with a naming identifier to be resolved.

In this implementation of the method for requesting the resolution of a naming identifier, the server hosting resources provides a network address of a server associated with a naming identifier that it is authorized to resolve without waiting until the terminal has verified the authenticity of the delegation parameter.

Such an implementation makes it possible to reduce the processing time of the naming identifier resolution, since once the authenticity of the delegation parameter is verified, the terminal can access a server associated with a naming identifier because it is already in possession of the network addresses of servers associated with a naming identifier.

According to another implementation of the method for requesting the resolution of at least one naming identifier, the method includes, when the authenticity of said delegation parameter is verified and prior to receipt of the message including the network address of a server associated with said naming identifier to be resolved:

a step of transmitting a naming identifier resolution request to the server hosting resources.

In this implementation of the method for requesting the resolution of a naming identifier, the server hosting resources provides a network address of a server associated with a naming identifier that it is authorized to resolve in response to a naming identifier resolution request transmitted by the terminal after verification of the authenticity of the delegation parameter.

According to a particular feature of the method for requesting the resolution of a naming identifier, the verification of the authenticity of the delegation parameter comprises:

the transmission of a request for information relating to the server hosting resources to a naming identifier resolver, the receipt of a message including a cryptographic key associated with an authoritative server associated with a naming identifier and the delegation parameter, the verification of the delegation parameter transmitted by the server hosting resources by means of the cryptographic key and the delegation parameter transmitted by the naming identifier resolver.

To ensure the authenticity of the delegation parameter transmitted by the server hosting resources, the terminal queries a naming identifier resolver, which is considered to be a reliable device.

According to a particular feature of the method for requesting the resolution of a naming identifier, the delegation parameter is a digital fingerprint of the naming identifier associated with said server hosting resources signed by the cryptographic key associated with an authoritative server associated with a naming identifier.

The development also concerns a server hosting resources that at least one terminal can access, said server hosting data being authorized to resolve at least one naming identifier, and including means for:

receiving a resource request transmitted by the terminal, in response to the resource request, transmitting, to the terminal, a message including at least one parameter, referred to as a delegation parameter, relating to an authorization for execution, by said server hosting resources, of a function of resolving at least one naming identifier, transmitting, to the terminal, at least one network address of a server associated with the naming identifier to be resolved.

Such a server hosting resources is, for example, a server managed by an internet service provider such as Orange. In this scenario, an example of resources hosted by such a server is the homepage orange.fr, which contains numerous links to other websites.

The development also relates to a terminal requesting a resolution of at least one naming identifier, including means for:

transmitting a resource request to a server hosting resources that the terminal can access, receiving a message, transmitted by the server hosting resources, including at least one parameter, referred to as a delegation parameter, relating to an authorization for execution, by said server hosting resources, of a function of resolving at least one naming identifier, verifying the authenticity of said delegation parameter,

when the authenticity of said delegation parameter is
verified, transmitting a resource request to a server
associated with the naming identifier to be resolved and
for which a network address is provided by the server
hosting resources.

Such a terminal is, for example, a computer or a smart-
phone equipped with a web browser.

The development finally concerns computer program
products including program code instructions for imple-
menting methods as described above when they are executed
by a processor.

The development also relates to a computer-readable
recording medium on which computer programs are
recorded, which programs include program code instruc-
tions for executing the steps of the methods according to the
development as described above.

Such a recording medium can be any entity or device
capable of storing the program(s). For example, the medium
may comprise storage means, such as a ROM, for example
a CD ROM or a microelectronic circuit ROM, or magnetic
recording means, for example a USB key or a hard disk.

In addition, such a recording medium can be a transmis-
sible medium such as an electrical or optical signal, which
can be routed via an electric or optic cable, by radio or by
other means, so that the computer programs that it contains
can be run remotely. The programs according to the devel-
opment may, in particular, be uploaded to a network, for
example, the Internet.

Alternatively, the recording medium may be an integrated
circuit in which the programs are incorporated, the circuit
being suitable for executing or for being used in the execu-
tion of the above-mentioned methods of the development.

BRIEF DESCRIPTION OF THE DRAWINGS

Other objectives, features and advantages of the devel-
opment will appear more clearly on reading the following
description, provided as a simple illustrative and non-lim-
iting example, in relation to the figures, wherein.

DETAILED DESCRIPTION OF CERTAIN
ILLUSTRATIVE EMBODIMENTS

The general principle of the development is based on the
delegation of the resolution of naming identifiers, normally
carried out by naming identifier resolvers, to servers hosting
resources, such as web servers, managed for example by an
internet service provider.

Figure 1:
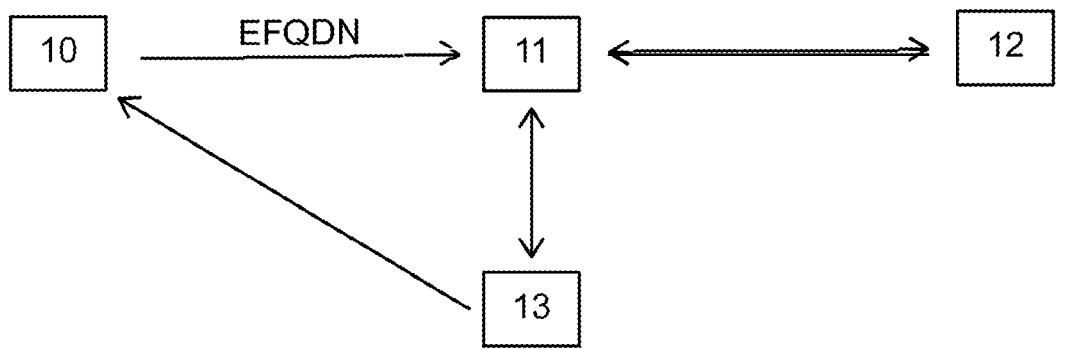
FIG. 1 shows an example of a naming identifier resolution
scenario known from the prior art.
Figure 2:
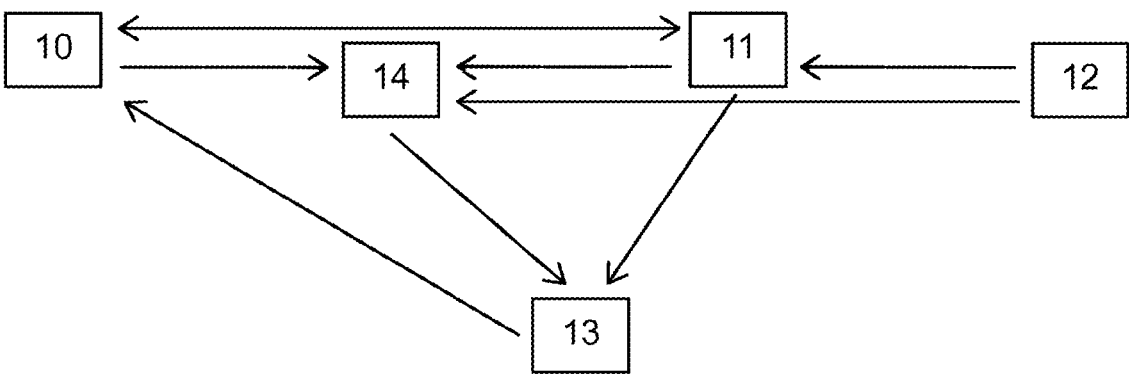
FIG. 2 shows a system in which the methods of the
development are implemented.

FIG. 2 shows a system in which the methods of the
development are implemented.

The system includes at least one terminal 10 requesting a
naming identifier resolution, a server hosting resources 14 whose naming identifier is, for example, orange.fr, at least
one naming identifier resolver 11, at least one authoritative
server 12 associated with a naming identifier and at least one
server 13 associated with a naming identifier to be resolved,
this server 13 storing data relating to the implementation of
a service requested by the terminal 10 such as data relating
to a web page or data relating to downloadable content, etc.

The terminal 10 can exchange messages with the server
hosting resources 14 and with the naming identifier resolver
11. A terminal 10 is a device capable of transmitting requests
to obtain content such as a personal computer, a home
gateway, a digital television decoder, a smartphone, etc.

The naming identifier resolver 11 receives messages from
the authoritative server 12 and exchanges messages with the
server hosting resources 14 and the server 13.

The server 13 exchanges messages with the server hosting
resources 14 and with the terminal 10.

These various exchanges of messages between different
devices as well as the content of the messages are explained
in greater detail later in this document.

Figure 3:
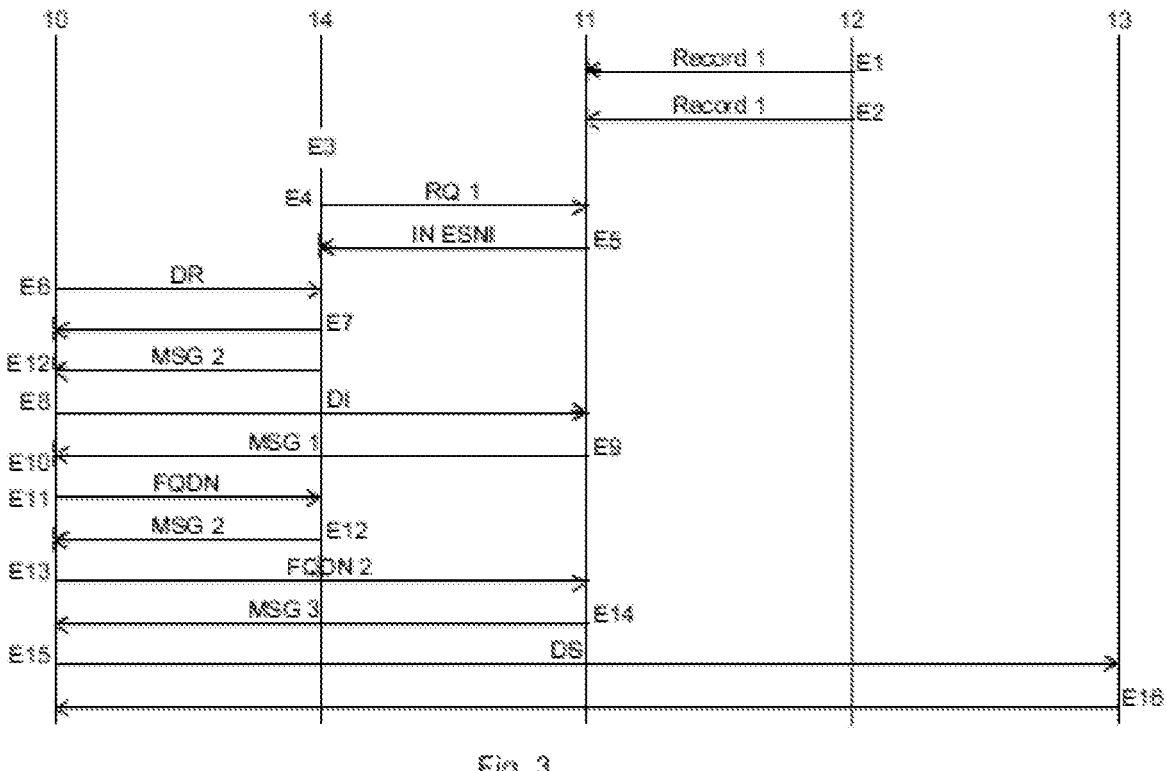
FIG. 3 shows a diagram of exchanges between different
communication devices involved in the implementation of
the methods for resolving at least one naming identifier and
for requesting the resolution of at least one naming identifier, FIG. 4 figure shows a terminal 10 according to an
embodiment of the development. Such a terminal 10 is
capable of implementing the various embodiments of the
method for requesting the resolution of a naming identifier.

FIG. 3 shows a diagram of exchanges between different
communication devices involved in the implementation of
the methods for resolving at least one naming identifier and
for requesting the resolution of at least one naming identifier.

In a step E1, the authoritative server 12 associated with
the naming identifier journal.fr transmits a first message,
Record 1, such as, for example, a DNS record-type message
including an IP address associated with the server 13 asso-
ciated with the naming identifier journal.fr, to the naming
identifier resolver 11. An example of such a Record 1
message is provided below:

DNS record journal.fr IN A: 10.1.1.10 where 10.1.1.10 is
the IP address associated with the server 13 associated with
the naming identifier journal.fr.

The authoritative server 12 can transmit, in one or more
Record 1 messages, the IP addresses of different servers 13
associated with naming identifiers themselves associated
with the authoritative server 12.

The naming identifier resolver 11 stores these IP addresses
and the associated naming identifier in a correspondence
table used in the resolution of naming identifiers.

In a step E2, the authoritative server 12 associated with
the naming identifier journal.fr transmits a second message,
Record 2, such as, for example, a message of the DNS record
ESNI type including a cryptographic key associated with the
authoritative server 12 and a delegation parameter associ-
ated with the server hosting resources 14 for the naming
identifier journal.fr, to the naming identifier resolver 11. An
example of such a Record 2 message is provided below:

```
ESNI record journal.fr {
    SNI encryption key: C5E74D
    Trusted_entities: {
        orange.fr_encrypted: 9B5D248 #
    }
```

The authoritative server 12 transmits, for each of the
naming identifiers associated with it, a Record 2 message
including the cryptographic key associated with the authori-
tative server 12 and a delegation parameter associated with
the server hosting resources 14 for a given naming identifier,
such as, for example, sport.com, to the naming identifier
resolver 11.

An example of such a Record 2 message is provided
below:

```
ESNI record sport.com {
    SNI encryption key: C5E74D
    Trusted_entities: {
        orange.fr_encrypted: A359DA8
    }
}
```

In a known manner, to allow the encryption of an ESNI field of a TLS (Transport Layer Security) message, "ClientHello", transmitted by a terminal 10, the authoritative server associated with the naming identifier FQDN_i computes a pair of private and public cryptographic keys. The authoritative server 12 associated with the naming identifier FQDN_i announces the public key in a message of the DNS record ESNI type to a naming identifier resolver 11. The terminal obtains this public key from the naming identifier resolver 11.

Once in possession of the public key, the terminal 11 encrypts the ESNI field of the TLS ClientHello message with this public key. The TLS ClientHello message is then transmitted to a server associated with the naming identifier FQDN_i. The server associated with the naming identifier FQDN_i decrypts the "TLS ClientHello" message using the private key and transmits a "ServerHello TLS" message to the terminal 10 in order to establish an HTTPS connection between the server associated with the naming identifier FQDN_i and the terminal 10.

In the present methods for resolving at least one naming identifier and requesting the resolution of at least one naming identifier, the authoritative server 12 encrypts, with the private key associated with the public key, each naming identifier associated with a server hosting resources 14 to which it gives authorization to execute a function of resolving at least one naming identifier. In the example described, the public key of the authoritative server 12 is C5E74D. The authoritative server 12 then computes a digital fingerprint of the naming identifier associated with the server hosting resources 14 signed by the cryptographic key associated with the authoritative server (12). Such a digital fingerprint is, for example, a hash of the public key and the naming identifier, orange.fr, associated with the server hosting resources 14. The authoritative server 12 thus determines the delegation parameter of the server hosting resources 14 for the naming identifierjournal.fr: 9B5D248#. The delegation parameter of the server hosting resources 14 is transmitted in the "Trusted entities" field and the public key of the authoritative server 12 is transmitted in the "SNI encryption" key field of the Record 2 message when it is a message of the DNS record ESNI type.

In a particular embodiment of the methods for resolving at least one naming identifier and requesting the resolution of at least one naming identifier, the different messages Record 1 and Record 2 are transmitted by the authoritative server 12 directly to the server hosting resources 14.

These steps E1 and E2 do not directly trigger steps E3 and following, but must precede them in order to ensure the successful execution of the methods for resolving at least one naming identifier and requesting the resolution of at least one naming identifier.

In a step E3, the server hosting resources 14 stores, in a cache, IP addresses of the servers 13 associated with naming identifiers. This information can be transmitted by authoritative servers 12 associated with naming identifiers.

In a step E4, the server hosting resources 14 transmits a request RQ1 to the naming identifier resolver 11 in order to obtain a delegation parameter relating to a particular naming identifier in order to be capable of resolving it. Such a request RQ1 is, for example, a message of the DNS query ESNI type (Domain Name System query Encrypted Server Name Indication) including the naming identifier for which the delegation parameter is requested, in this case journal.fr. On receipt of this request RQ1, the naming identifier resolver 11 transmits, for example, an ESNI response message to the server hosting resources 14 in a step E5 including the requested delegation parameter, in this case 9B5D248 #.

The server hosting resources 14 transmits such a request RQ1 for each of the naming identifiers for which a delegation parameter associated with the server hosting resources 14 has been generated by the authoritative server.

Such an ESNI response message includes, inter alia, the delegation parameter associated with the server hosting resources 14 and corresponding to a particular naming identifier, for example, journal.fr.

Similarly, the resolver 11 transmits an ESNI response message for each of the naming identifiers for which a delegation parameter has been requested by the server hosting resources 14.

These steps E4 and E5 do not directly trigger steps E6 and following, but must precede them in order to ensure the successful execution of the methods for resolving at least one naming identifier and requesting the resolution of at least one naming identifier.

Once the terminal 10 has established a communication session with the server hosting resources 14, it transmits, in a step E6, a resource request DR to the server hosting resources 14. Such a resource request is, for example, a message of the HTTPS GET resource orange.fr type.

In response to this resource request DR, the server hosting resources 14 transmits, in a step E7, the requested resources as well as a list including the different delegation parameters associated with the server hosting resources 14 and corresponding to the different naming identifiers that the server hosting resources 14 is authorized to resolve. Thus, for the naming identifier journal.fr, the server hosting resources 14 transmits the delegation parameter 9B5D248#, and for the naming identifier sport.com, the server hosting resources 14 transmits the delegation parameter A359DA8.

In a particular embodiment, step E3 can be implemented by the server hosting resources 14 after the implementation of step E7, for example if it is the first time that the server hosting resources 14 receives a request for resources of the HTTPS GET resource orange.fr type from a terminal 10, following a cleaning of the cache of the server hosting resources 14, for example.

Steps E8 to E10 described below constitute a phase of verification of the authenticity of the delegation parameters transmitted by the server hosting resources 14.

Thus, in a step E8, the terminal 10 transmits a request for information DI relating to the server hosting resources 14 to the naming identifier resolver 11. Such a request for information includes at least one naming identifier, for example journal.fr, for which the terminal seeks to verify the delegation parameter associated with the server hosting resources 14. The request for information DI is, for example, a message of the DNS query ESNI type.

In a step E9, the naming identifier resolver 11 transmits a message MSG1, such as, for example, a message of the DNS record ESNI type, including the public key C5E74D associated with the authoritative server 12 and the delegation parameter 9B5D248# associated with the server hosting resources 14 for the naming identifier journalfr.

In this implementation example, upon completion of step E9, the terminal 10 has a first version V1 of the delegation parameter associated with the server hosting resources 14 for the naming identifier journal.fr that it received from the server hosting resources 14 in step E7, and a second version V2 of the delegation parameter associated with the server hosting resources 14 for the naming identifier journal.fr that it received from the naming identifier resolver 11 in step E9. This second version V2 of the delegation parameter associated with the server hosting resources 14 for the naming identifier journal.fr is considered to be reliable because it was transmitted by reliable equipment, namely the naming identifier resolver 11.

In a step E10, the terminal 10 verifies the authenticity of the first version V1 of the delegation parameter. For this, the terminal 10 uses the ESNI encryption parameters, such as, for example, the public key C5E74D, associated with the authoritative server 12 in order to verify the authenticity of the digital fingerprint of the first version V1 of the delegation parameter. It thus obtains a first decrypted version DcV1 of the naming identifier of the server hosting resources 14. The first decrypted version DcV1 of the naming identifier gives "orange.fr".

The terminal 10 also decrypts the second version V2 of the delegation parameter associated with the server hosting resources 14 by means of the public key. It thus obtains a second decrypted version DcV2 of the naming identifier of the server hosting resources 14. In this case, the second decrypted version DcV2 of the naming identifier thus decrypted gives "orange.fr". The terminal 10 then compares the first decrypted version DcV1 of the naming identifier of the server hosting resources 14 with the second decrypted version DcV2 of the naming identifier of the server hosting resources 14. When the two decrypted versions DcV1 and DcV2 of the naming identifier associated with the server hosting resources 14 correspond, the authenticity of the delegation parameter associated with the server hosting resources 14 for a given naming identifier is verified.

When the authenticity of the delegation parameter associated with the server hosting resources 14 for a given naming identifier is verified, the terminal 10 then transmits, in a step E11, a request to resolve naming identifiers FQDN to the server hosting resources 14. Such a request to resolve naming identifiers FQDN may comprise only one naming identifier to be resolved, or all the naming identifiers for which the server hosting resources 14 is authorized to carry on a naming identifier resolving function. Such a request to resolve naming identifiers FQDN is, for example, a message of the DOH query ip type including at least one naming identifier.

In a step E12, the server hosting resources 14 transmits a message MSG2 to the terminal 10. The message MSG2 includes at least one network address of a server 13 associated with a naming identifier to be resolved, this server 13 storing data relating to the implementation of a service requested by the terminal 10.

In a particular embodiment, referred to as "push" mode, of the methods for resolving at least one naming identifier and requesting the resolution of at least one naming identifier, step E11 is not implemented by the terminal 10 and step 12 takes place between steps E7 and E8. This embodiment makes it possible to reduce the time for processing the resolution of a naming identifier, since once the authenticity of the delegation parameter is verified, the terminal 10 can access a server 13 associated with a naming identifier because it is already in possession of the network addresses of servers 13 associated with a naming identifier.

When the two decrypted versions DcV1 and DcV2 of the naming identifier associated with the server hosting resources 14 do not correspond, the authenticity of the delegation parameter associated with the server hosting resources 14 for a given naming identifier is not verified.

In such a situation, the terminal 10 behaves as if it had not received delegation parameters from the server hosting resources 14 and transmits, in a step E13, a request to resolve naming identifiers FQDN2 to the naming identifier resolver 11 requesting the resolution of at least one naming identifier for which the server hosting resources 14 is not authorized to carry out a naming identifier resolution. Such a request to resolve naming identifiers FQDN2 includes the naming identifier to be resolved, for example sport.com. Such a request to resolve naming identifiers FQDN2 is, for example, a message of the DOH query ip type.

In a step E14, the naming identifier resolver 11 transmits a message MSG3 to the terminal 10. The message MSG2 includes at least one network address of a server 13 associated with the naming identifier to be resolved, in this case sport.com.

In a particular embodiment, the naming identifier resolution function can be limited only to naming identifiers of content referenced in the resources hosted by the server hosting resources 14. Thus, the terminal 10 can reject the resolutions of certain naming identifiers for which the server hosting resources 14 has a resolution delegation but the content of which is not hosted by the server hosting resources 14. For example, the server hosting resources 14 has a delegation for resolving the naming identifier replay.fr, but the content associated with this naming identifier replay.fr is not referenced among the resources hosted by the server hosting resources 14; in this scenario, the terminal 10 does not transmit a naming identifier resolution request to the server hosting resources 14 for the naming identifier replay.fr.

In a step E15, the terminal 10 transmits a resource request DS to a server 13 to obtain data relating to the implementation of a service requested by the terminal 10. Such a request to establish a communication session DS is, for example, a message of the GET journal.fr content from @ip_journal.fr type.

In response to this resource request DS, the server 13 provides the requested resource in a step E16.

Figure 4:
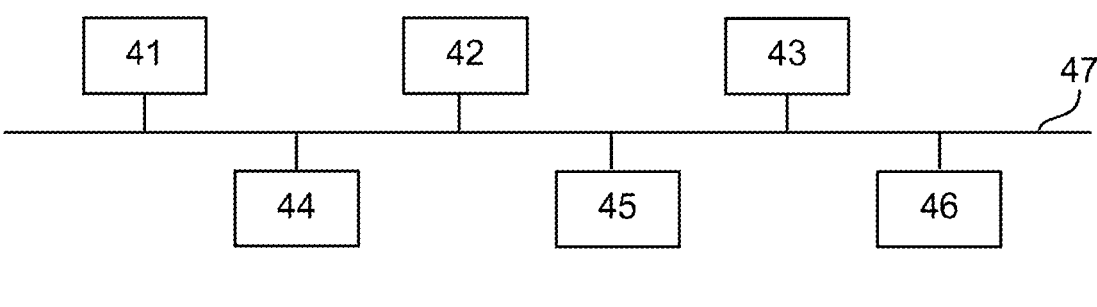

FIG. 4 shows a terminal 10 according to an embodiment of the development. Such a terminal 10 is capable of implementing the different embodiments of the method for requesting the resolution of a naming identifier according to FIG. 3.

A terminal 10 can include at least one hardware processor 41, a storage unit 42, an input device 43, a display device 44, an interface 45, and at least one network interface 46, which are connected to one another via a bus 47. Of course, the elements constituting the terminal 10 may be connected by way of a connection other than a bus.

The processor 41 controls the operations of the terminal 10. The storage unit 42 stores at least one program for implementing the method according to an embodiment of the development to be carried out by the processor 41, and various data, such as parameters used for computations carried out by the processor 41, intermediate data of computations carried out by the processor 41, etc. The processor 41 can be formed by any known and appropriate hardware or software, or by a combination of hardware and software. For example, the processor 41 can be formed by dedicated hardware such as a processing circuit, or by a programmable processing unit such as a central processing unit that runs a program stored in a memory of same.

The storage unit 42 can be formed by any suitable means capable of storing the program or programs and data in a computer-readable manner. Examples of a storage unit 42 include computer-readable non-transitory storage media such as semiconductor memory devices, and magnetic, optical or magneto-optic recording media loaded into a read and write unit.

The input device 43 can be formed by a keypad, a pointing device such as a mouse to be used by a user to enter commands. The display device 504 can also be formed by a display module, such as, for example, a graphical user interface or GUI.

The interface 45 provides an interface between the terminal 10 and another device.

At least one network internet 46 provides a connection between the terminal 10 and the server hosting resources 14, the resolver 11 and the servers 13.

Figure 5:
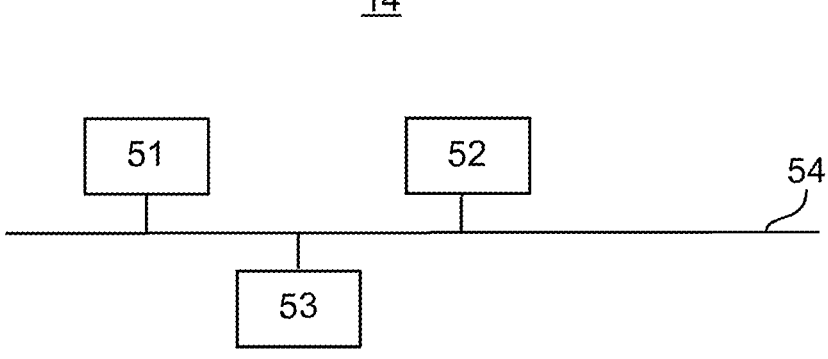
FIG. 5 shows a server hosting resources capable of
implementing the various embodiments of the naming iden-
tifier resolution method.

FIG. 5 shows a server hosting resources 14 capable of implementing the various embodiments of the method for resolving naming identifiers according to FIG. 3.

A server hosting resources 14 can include at least one hardware processor 51, a storage unit 52, and at least one network interface 53, which are connected to one another via a bus 54. Of course, the elements constituting the server hosting resources 14 may be connected by way of a connection other than a bus.

The processor 51 controls the operations of the server hosting resources 14. The storage unit 52 stores at least one program for implementing the method according to an embodiment to be carried out by the processor 51, and various data, such as parameters used for computations carried out by the processor 51, intermediate data of computations carried out by the processor 51, etc. The processor 51 can be formed by any known and appropriate hardware or software, or by a combination of hardware and software. For example, the processor 51 can be formed by dedicated hardware such as a processing circuit, or by a programmable processing unit such as a central processing unit that runs a program stored in a memory of same.

The storage unit 52 can be formed by any suitable means capable of storing the program or programs and data in a computer-readable manner. Examples of a storage unit 52 include computer-readable non-transitory storage media such as semiconductor memory devices, and magnetic, optical or magneto-optic recording media loaded into a read and write unit.

At least one network interface 53 provides a connection between the server hosting resources 14, the resolver 11, the terminal 10 and the authoritative server 12.

The invention claimed is:

1. A method of resolving at least one naming identifier, the method being implemented by a server hosting resources that at least one terminal can access with an Internet browser, and comprising:

receiving a resource request transmitted by the at least one terminal which can access resources of the server hosting resources with an Internet browser;

in response to the resource request, transmitting, to the at least one terminal, requested resources and a message including at least one parameter, referred to as a delegation parameter, relating to an authorization for execution, by the server hosting resources, of a function of resolving at least one naming identifier, the delegation parameter being generated by an authoritative server associated with a naming identifier and being specific to each server hosting resources to which a naming identifier resolution function is delegated;

receiving a request, transmitted by the at least one terminal, to resolve at least one naming identifier, when the authenticity of the delegation parameter is verified by the at least one terminal; and transmitting, to the at least one terminal, at least one network address of a server associated with the naming identifier to be resolved, wherein the delegation parameter is a digital fingerprint of the naming identifier associated with the server hosting resources signed by a cryptographic key associated with an authoritative server associated with at least one naming identifier.

2. The method of resolving at least one naming identifier according to claim 1, including, prior to transmitting the delegation parameter, receiving a message including the delegation parameter.

3. The method of resolving at least one naming identifier according to claim 2, wherein the message received is transmitted by the authoritative server associated with at least one naming identifier.

4. The method of resolving at least one naming identifier according to claim 2, wherein the message received is transmitted by a naming identifier resolver.

5. A processing circuit comprising a processor and a memory, the memory storing program code instructions of a computer program for implementing the method according to claim 4, when the computer program is executed by the processor.

6. A processing circuit comprising a processor and a memory, the memory storing program code instructions of a computer program for implementing the method according to claim 1, when the computer program is executed by the processor.

7. The method of resolving at least one naming identifier according to claim 1, wherein the server hosting resources performs at least a function different from a function executed by a naming identifier resolver.

8. The method of resolving at least one naming identifier according to claim 1, wherein the server hosting resources is a web server.

9. The method of resolving at least one naming identifier according to claim 1, wherein the server hosting resources is not a public naming identifier resolver.

10. A method of requesting the resolution of at least one naming identifier, the method being implemented by a terminal and comprising:

transmitting a resource request to a server hosting resources that the terminal can access with an Internet browser;

receiving requested resources and a message, transmitted by the server hosting resources, including at least one parameter, referred to as a delegation parameter, relating to an authorization for execution, by the server hosting resources, of a function of resolving at least one naming identifier, the delegation parameter being generated by an authoritative server associated with a naming identifier and being specific to each server hosting resources to which a naming identifier resolution function is delegated;

verifying the authenticity of the delegation parameter;

when the authenticity of the delegation parameter is verified, transmitting, to the server hosting resources, a request to resolve at least one naming identifier; and transmitting a resource request to a server associated with the naming identifier to be resolved and for which a network address is provided by the server hosting resources in response to the request to resolve at least one naming identifier, wherein the delegation parameter is a digital fingerprint of the naming identifier associated with the server hosting resources signed by a cryptographic key associated with an authoritative server associated with at least one naming identifier.

11. The method of requesting the resolution of at least one naming identifier according to claim 10, wherein the verification of the authenticity of the delegation parameter includes:

transmission of a request for information relating to the server hosting resources to a naming identifier resolver;

receipt of a message including a cryptographic key associated with an authoritative server associated with a naming identifier and the delegation parameter; and verification of the delegation parameter transmitted by the server hosting resources by means of the cryptographic key and the delegation parameter transmitted by the naming identifier resolver.

12. A server hosting resources that at least one terminal can access with an Internet browser, the server hosting data being authorized to resolve at least one naming identifier, and including at least a hardware processor configured to:

receive a resource request transmitted by the at least one terminal which can access resources of the server hosting resources with an Internet browser;

in response to the resource request, transmit, to the at least one terminal, requested resources and a message including at least one parameter, referred to as a delegation parameter, relating to an authorization for execution, by the server hosting resources, of a function of resolving at least one naming identifier, the delegation parameter being generated by an authoritative server associated with a naming identifier and being specific to each server hosting resources to which a naming identifier resolution function is delegated;

receive a request, transmitted by the at least one terminal, to resolve at least one naming identifier, when the authenticity of the delegation parameter is verified by the at least one terminal; and transmit, to the at least one terminal, at least one network address of a server associated with the naming identifier to be resolved, wherein the delegation parameter is a digital fingerprint of the naming identifier associated with the server hosting resources signed by a cryptographic key associated with an authoritative server associated with at least one naming identifier.

13. A terminal requesting a resolution of at least one naming identifier, including at least a hardware processor configured to:

transmit a resource request to a server hosting resources that the terminal can access with an Internet browser;

receive requested resources and a message, transmitted by the server hosting resources, including at least one parameter, referred to as a delegation parameter, relating to an authorization for execution, by the server hosting resources, of a function of resolving at least one naming identifier, the delegation parameter being generated by an authoritative server associated with a naming identifier and being specific to each server hosting resources to which a naming identifier resolution function is delegated;

verify the authenticity of the delegation parameter;

when the authenticity of the delegation parameter is verified, transmit to the server hosting resources, a request to resolve at least one naming identifier; and transmit a resource request to a server associated with the naming identifier to be resolved and for which a network address is provided by the server hosting resources in response to the request to resolve at least one naming identifier, wherein the delegation parameter is a digital fingerprint of the naming identifier associated with the server hosting resources signed by a cryptographic key associated with an authoritative server associated with at least one naming identifier.

* * * * *